March 29, 1927.

A. L. POWELL 1,622,841

MECHANICAL MOVEMENT

Original Filed Dec. 10, 1919

Inventor
A. L. Powell

Witness
J. J. L. Wright

By
Geo. H. Dorr
Attorney

Patented Mar. 29, 1927.

1,622,841

UNITED STATES PATENT OFFICE.

ALVAH L. POWELL, OF MILES CITY, MONTANA, ASSIGNOR TO THE A. L. POWELL POWER COMPANY, A CORPORATION OF MONTANA.

MECHANICAL MOVEMENT.

Original application filed December 10, 1919, Serial No. 343,958. Divided and this application filed November 9, 1923. Serial No. 673,853.

This invention relates to certain new and useful improvements in mechanical movements and is a divisional application of my application No. 343,958, filed December 10, 1919.

The principal object of the present invention is the novel manner in which the power is transmitted from a drive shaft to a driven element by means of orbital moving elements disposed between the drive shaft and the driven elements.

Another object of the invention resides in the novel manner in which the driven element is balanced.

While I have set forth above some of the objects of the present invention, it will, of course, be understood that others will present themselves to those skilled in the art.

Figure 1:
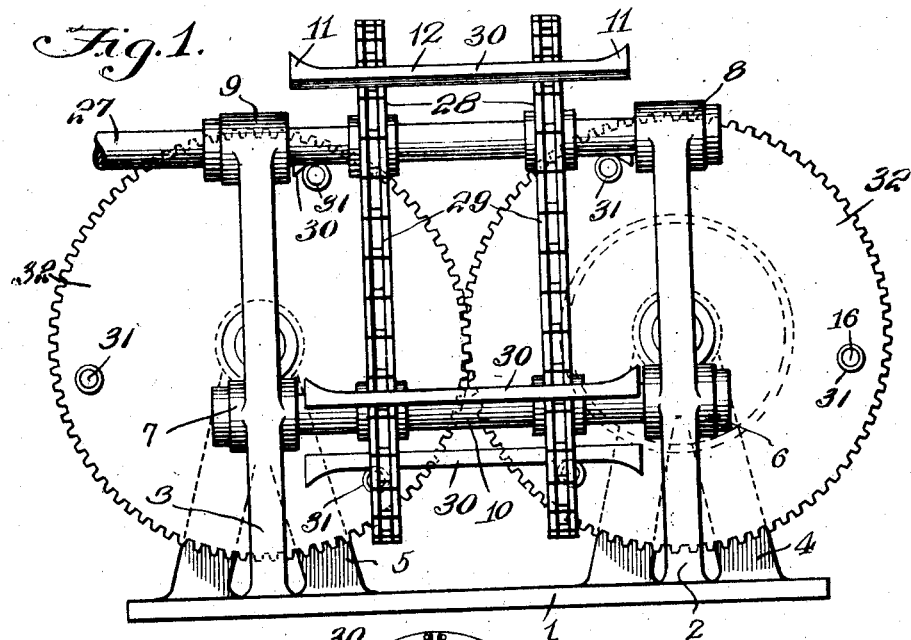
Figure 2:
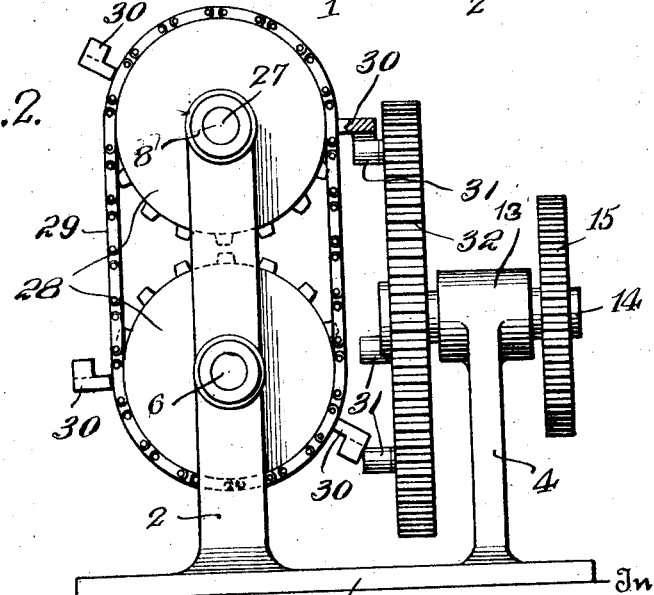

In the drawings, wherein I have shown merely for the purpose of illustration the preferred embodiments of the invention, Fig. 1 is a rear view of my improved mechanical movement, and Fig. 2 is an end view thereof.

Referring more in detail to the drawings wherein similar reference characters indicate similar parts throughout, a base 1 is provided having standards 2, 3, 4 and 5. The standards 2 and 3 are provided with bearings 6, 7, 8 and 9. A countershaft 10 is journaled in the bearings 6 and 7 in the standards 2 and 3 respectively and a drive shaft 27 is journaled in the bearings 8 and 9 in the standards 2 and 3 respectively. The drive shaft 27 extends beyond the standard 3 and is adapted to be rotated by any suitable power means.

Two or more sprocket wheels 28 are rigidly mounted on each of the shafts 10 and 27; the sprockets on the shaft 27 being in the same vertical plane with a corresponding sprocket wheel on the countershaft 10. Sprocket chains 29 are trained over the sprockets on the shaft 27 and those on the countershaft 10, there being one sprocket chain for each of the two sprockets which lie in the same plane. Transmission bars 30, preferably 4 in number are carried by the sprocket chains 29, each of the bars being provided near their outer ends with curved projections 11, between which curved projections, a flat bearing surface 12 is provided.

While I have mentioned the use of sprocket wheels and sprocket chains, any suitable power transmitting mechanism might be interposed between the drive shaft 27 and the countershaft 10, such as belt and pulleys, or the mechanical equivalents thereof.

In the standard 4, a bearing 13 is provided at the upper end thereof, in which bearing is journaled a shaft 14, on which are rigidly mounted gears 15 and 32, the gear 32 being considerably larger than the gear 15.

While in my preferred construction I show the gear 32 as being nearly twice as large as the gear 15, I do not limit myself to the relative sizes of these gears, for the sizes of the gears would vary as circumstances demand.

On the gear wheel 32, a plurality of stub shafts 16 are provided, preferably 3 in number, located equi-distant apart and approximately the same distances from the center of the shaft 14. On each of the stub shafts 16 is mounted a roller 31.

On the standard 5, a duplicate of the mechanism mounted on the standard 4 is provided, the gears 32 intermeshing so as to provide a balanced arrangement for the driven elements.

In operation, the shaft 27 drives the countershaft 10 by means of the sprocket wheels 28 and sprocket chains 29. The only function of the countershaft 10 is to hold the sprocket chains under tension. As the sprocket chains 29 travel over the sprocket wheels, the transmission bars 30 come into contact with the rollers 31 carried by the gear wheels 32, the curved projections 11 first contacting with the rollers 31, as is clearly shown in Fig. 1 of the drawings. As the transmission bar 30 travels downwardly after coming in contact with the rollers 31, the power is transmitted from the transmission bar 30 to the gear wheels 32, rotating the same and thereby rotating the driven gears 15 through the instrumentality of the shafts 14.

While I have described the preferred embodiment of my invention, it will, of course, be understood that many variations therefrom may be resorted to without sacrificing any of the spirit of the invention. I, therefore, do not limit myself to the specific embodiment here shown except as I may limit myself in the annexed claims:

What I claim is:—

1. In a mechanical movement a drive shaft, a countershaft, wheels carried by each of said shafts, flexible means passing over said wheels, transmission bars carried by said flexible means, each of said transmission bars having curved projections at their outer extremities, a driven shaft and power transmission means interposed between said driven shaft and said transmission bars, said curved projections being adapted to cam said transmission means inwardly and downwardly.

2. In a mechanical movement a drive shaft, a driven shaft, a sprocket carried by each of said shafts, a sprocket chain trained over each of said sprockets, transmission bars carried by the said chains, stub shafts, a gear on each stub shaft, rollers rotatably mounted on said gears, said driven means being actuated by the transmission bars exerting force on the said rollers.

3. In a mechanical movement a drive shaft, a countershaft, a plurality of sprockets on each of said shafts, flexible means operatively connecting the sprockets of the drive and countershafts, a plurality of transmission bars carried by the said flexible means, a driven means, power transmitting means interposed between the driven means and adapted to be actuated by said transmission bars, said transmission bars being provided with curved projections near their extremities adapted to engage said power transmitting means and cam the same inwardly and downwardly.

4. In a mechanical movement a drive shaft, a countershaft, a plurality of sprockets on each of said shafts, flexible means operatively connecting the sprockets of the drive and countershafts, a plurality of transmission bars carried by the said flexible means, a driven means, power transmitting means interposed between the driven means and adapted to be actuated by said transmission bars, said transmission bars being provided with curved projections near their extremities and means operatively connected with said driven means whereby the force transmitted may be increased.

In testimony whereof I affix my signature.

ALVAH L. POWELL.